(12) United States Patent
Borufka et al.

(10) Patent No.: US 8,888,456 B2
(45) Date of Patent: Nov. 18, 2014

(54) ROTOR AND METHOD FOR MANUFACTURING A ROTOR FOR A TURBO MACHINE

(75) Inventors: Hans Peter Borufka, Starnberg (DE); Frank Stiehler, Bad Liebenwerda (DE)

(73) Assignee: MTU Aero Engines GmbH, Munich (DE)

(*) Notice: Subject to any disclaimer, the term of this patent is extended or adjusted under 35 U.S.C. 154(b) by 462 days.

(21) Appl. No.: 13/295,846

(22) Filed: Nov. 14, 2011

(65) Prior Publication Data

US 2012/0121384 A1    May 17, 2012

(30) Foreign Application Priority Data

Nov. 15, 2010 (EP) .................................... 10191243
Nov. 17, 2010 (EP) .................................... 10191460
Nov. 17, 2010 (EP) .................................... 10191461
Nov. 17, 2010 (EP) .................................... 10191462

(51) Int. Cl.
*F01D 5/22*     (2006.01)
*F04D 29/32*    (2006.01)
*F01D 11/00*    (2006.01)
*F04D 29/66*    (2006.01)

(52) U.S. Cl.
CPC ............... *F04D 29/321* (2013.01); *F01D 5/22* (2013.01); *Y02T 50/671* (2013.01); *F01D 11/006* (2013.01); *F04D 29/668* (2013.01); *Y02T 50/673* (2013.01); *Y02T 50/676* (2013.01)
USPC ...................................................... 416/96 R

(58) Field of Classification Search
CPC ....... F01D 5/22; F01D 11/008; F01D 11/005; F01D 11/006

USPC .............. 416/190, 193 A, 194, 500; 415/134, 415/138, 139
See application file for complete search history.

(56) References Cited

U.S. PATENT DOCUMENTS 2,942,843 A * 6/1960 Sampson ........................ 416/190
3,182,955 A * 5/1965 Hyde ............................ 416/96 R
3,709,631 A   1/1973 Karstensen et al.
3,752,599 A * 8/1973 Pace .............................. 416/190

(Continued)

FOREIGN PATENT DOCUMENTS

DE    2430181 A1    1/1975
EP    0062558 A1    10/1982

(Continued)

*Primary Examiner* — Edward Look
*Assistant Examiner* — Eldon Brockman
(74) *Attorney, Agent, or Firm* — Barlow, Josephs & Holmes, Ltd.

(57) ABSTRACT

The invention relates to a rotor for a turbo machine, having rotating blades (12), which are joined to a basic rotor body (14), whereby a damping element (24) for damping blade vibrations is provided between blade platforms (10) of at least two adjacent rotating blades (12), damping element (24) being arched radially upward along its axial extent relative to an axis of rotation of the rotor. In addition, the invention relates to a method for manufacturing, repairing, and/or overhauling a rotor for a turbo machine, in which rotating blades (12) are joined to a basic rotor body (14), whereby a damping element (24) for damping blade vibrations is disposed between at least two adjacent rotating blades (12). In this case, damping element (24) is arched radially upward along its axial extent relative to an axis of rotation of the rotor.

17 Claims, 2 Drawing Sheets

(56) References Cited

U.S. PATENT DOCUMENTS

| | | | | |
|---|---|---|---|---|
| 3,918,842 | A * | 11/1975 | Longley et al. | 416/219 R |
| 4,008,978 | A * | 2/1977 | Smale | 415/134 |
| 4,177,013 | A * | 12/1979 | Patterson et al. | 416/193 A |
| 4,311,432 | A * | 1/1982 | Kildea | 415/134 |
| 4,455,122 | A * | 6/1984 | Schwarzmann et al. | 416/190 |
| 4,749,333 | A * | 6/1988 | Bonner et al. | 415/189 |
| 4,784,571 | A | 11/1988 | Ferleger | |
| 4,872,810 | A | 10/1989 | Brown et al. | |
| 4,872,812 | A * | 10/1989 | Hendley et al. | 416/190 |
| 5,156,528 | A * | 10/1992 | Bobo | 416/190 |
| 5,228,835 | A * | 7/1993 | Chlus | 416/193 A |
| 5,709,530 | A * | 1/1998 | Cahill et al. | 415/170.1 |
| 5,785,499 | A * | 7/1998 | Houston et al. | 416/248 |
| 5,803,710 | A * | 9/1998 | Dietrich et al. | 416/248 |
| 5,827,047 | A * | 10/1998 | Gonsor et al. | 416/193 A |
| 5,924,699 | A * | 7/1999 | Airey et al. | 277/411 |
| 6,109,877 | A * | 8/2000 | Gekht et al. | 416/221 |
| 6,273,683 | B1 * | 8/2001 | Zagar et al. | 416/193 A |
| 6,659,725 | B2 * | 12/2003 | Yeo et al. | 416/190 |
| 6,776,583 | B1 * | 8/2004 | Wang et al. | 416/220 R |
| 6,932,575 | B2 * | 8/2005 | Surace et al. | 416/193 A |
| 7,021,898 | B2 * | 4/2006 | Elliott et al. | 416/193 A |
| 7,121,800 | B2 * | 10/2006 | Beattie | 416/190 |
| 7,261,514 | B2 * | 8/2007 | London et al. | 415/134 |
| 7,322,797 | B2 * | 1/2008 | Lee et al. | 416/193 A |
| 7,367,123 | B2 * | 5/2008 | Itzel et al. | 29/889.2 |
| 7,524,163 | B2 * | 4/2009 | Self et al. | 415/115 |
| 7,527,472 | B2 * | 5/2009 | Allen | 415/139 |
| 7,534,090 | B2 * | 5/2009 | Good et al. | 416/193 A |
| 7,628,588 | B2 * | 12/2009 | Itzel et al. | 416/190 |
| 7,731,482 | B2 * | 6/2010 | Lagrange et al. | 416/190 |
| 8,011,892 | B2 * | 9/2011 | Ramlogan et al. | 416/190 |
| 8,066,489 | B2 * | 11/2011 | Holmes | 416/193 A |
| 8,393,869 | B2 * | 3/2013 | Kim et al. | 416/219 R |
| 8,596,983 | B2 * | 12/2013 | Kim et al. | 416/219 R |
| 8,613,599 | B2 * | 12/2013 | Lake et al. | 416/221 |
| 2002/0146322 | A1 * | 10/2002 | Yeo et al. | 416/190 |
| 2003/0012647 | A1 * | 1/2003 | Shiozaki et al. | 415/191 |
| 2005/0220619 | A1 * | 10/2005 | Self et al. | 416/174 |
| 2006/0056974 | A1 * | 3/2006 | Beattie | 416/193 A |
| 2007/0110580 | A1 * | 5/2007 | Tibbott et al. | 416/193 A |
| 2007/0134099 | A1 * | 6/2007 | Lee et al. | 416/193 A |
| 2008/0014094 | A1 * | 1/2008 | Itzel et al. | 416/248 |
| 2009/0116953 | A1 * | 5/2009 | Spangler et al. | 415/115 |
| 2009/0263235 | A1 * | 10/2009 | Tibbott et al. | 415/116 |
| 2012/0121424 | A1 * | 5/2012 | Wassynger et al. | 416/190 |

FOREIGN PATENT DOCUMENTS

| | | |
|---|---|---|
| EP | 0717169 A1 | 6/1996 |
| EP | 0851096 A2 | 7/1998 |
| EP | 1167691 A2 | 1/2002 |
| EP | 1985810 A1 | 10/2008 |
| EP | 2009247 A2 | 12/2008 |
| GB | 2226368 A | 6/1990 |
| WO | 03102380 A1 | 12/2003 |

* cited by examiner

ROTOR AND METHOD FOR MANUFACTURING A ROTOR FOR A TURBO MACHINE

BACKGROUND OF THE INVENTION

The invention relates to a rotor of the type indicated in the preamble of patent claim 1 for a turbo machine as well as a turbo machine having a rotor. In addition, the invention relates to a method of the type indicated in the preamble of patent claim 12 for manufacturing a rotor for a turbo machine.

This type of rotor is already known from the prior art and comprises damping elements for damping blade vibrations that are introduced into through-channels or relief channels on the side of the blade neck between adjacent blades as so-called under-platform dampers. Because of their position relative to the vibrating system, these damping elements, however, frequently do not offer sufficient damping of the different forms of vibration.

EP 1 795 703 A2 discloses a bladed rotor, in which, below its respective blade platform, each rotating blade has a cooling chamber, into which the cooling air is conducted during the operation of the associated turbine. On its end facing away from the blade neck of the rotating blade, the cooling chamber is sealed by means of a damping element and there is one or more outlet openings in the blade platform, through which the cooling air can exit. Alternatively, it is provided that the cooling chamber is fluidically decoupled from the inner cooling channel of the rotating blade and is provided with cooling air by means of inlet openings in the damping element. The damping element essentially comprises a plate-shaped element, which, in the mounted state, extends linearly along a corresponding sealing surface of the cooling chamber. The radially upper end region of the damping element is supported against a lateral surface of an adjacent rotating blade. Underneath the sealing surface of the cooling chamber are formed projections that are disposed at an acute angle to the sealing surface of the cooling chamber and that support corresponding end regions of the damping element that are approximately V-shaped in cross section. Due to the acute angle between the sealing surface of the cooling chamber and the projections, friction forces are produced during the operation of the turbo machine and these forces are used for sealing the cooling chamber as well as for damping vibrations. Since the damping element not only damps vibrations, but simultaneously must seal a relatively large surface, both the damping element and the rotating blade are subject to high structural limitations.

In addition, it is known from EP 0 511 022 B1 to brace rotating blades of a rotor against one another via a wire-like damping element by guiding the damping element through the blade elements. This solution, however, in particular, has the disadvantage that the wire-like damping element is found in the flow path or annular channel. In particular, this solution is not applicable or is only conditionally applicable in the case of internally cooled blades.

It is known from EP 1 944 466 A1 to dispose damping elements in pockets of adjacent rotating blade shrouds in a rotor for a turbo machine. During a rotation of the rotor, the damping elements are moved radially upward due to centrifugal force and thus bring about a mechanical coupling of the rotating blade shrouds. This solution, however, is not suitable for rotors without an external shroud. Further, an optimal adjustment of the vibration damping is also not possible with this system.

SUMMARY OF THE INVENTION

The object of the present invention is to create a rotor of the type named initially, which has an improved vibration behavior. Another object of the invention is to create a method for manufacturing a rotor having an improved vibration behavior.

The objects are accomplished according to the invention by a rotor with the features of patent claim 1, as well as by a method with the features of patent claim 12. Advantageous embodiments of the invention are indicated in the respective subclaims, whereby advantageous embodiments of the rotor are to be viewed as advantageous embodiments of the method and vice versa.

In a rotor according to the invention for a turbo machine, which has an improved vibration behavior, it is provided that the damping element is arched radially upward along its axial extent relative to an axis of rotation of the rotor. Since the damping element is moved radially upward during the rotation of the rotor due to the centrifugal force field, a stable symmetrical self-alignment of the damping element and a reliable contact with the associated rotating blades is achieved by the arched or bent configuration. In contrast to the prior art, as much mass as possible of the damping element also can be shifted radially upward as far as possible. The damping element is disposed in a position in which displacements of vibrating structures occur that are sufficient for vibration processes due to the preferably symmetric arrangement between adjacent blade platforms. By arranging the damping element between the blade platforms, due to the relative displacements between the damping element and the adjacent rotating blades or blade platforms, a great deal of energy can additionally be dissipated even at critical resonance transitions that are due, for example, to bending and torsional vibrations, for which reason, the rotor is particularly robust in the mechanical damping sense. In addition, the damping element can be integrated in the rotor in a particularly simple and cost-effective manner, and is also sparing of structural space. The structural configuration space that is available can therefore be optimally utilized, so that unlike the prior art, the configuration and size of the damping element can be selected in such a way that design and implementation requirements are completely fulfilled. In this way, the mass of the damping element serves as an optimizing parameter and for definition of switching points between so-called "locked and slipping" states, i.e., between a state of the damping element that is stationary relative to the rotating blade and one that is moveable relative to the rotating blade. Further, the damping element can be very simply mounted and demounted, by which means corresponding cost advantages for manufacturing, repairing or overhauling of the rotor are achieved. The rotor can be designed basically in this way for use in compressor or turbine stages with and without shroud, with or without blade cooling and with or without blade cavities. In addition, it can be basically provided that one and/or several damping elements can be disposed between several and/or all of the blade platforms of the rotor, by which means a particularly flexible adaptability to different requirement profiles and configurations of the rotor is achieved.

In an advantageous embodiment of the invention, it is provided that a sealing element, by means of which an exchange of flow medium in the radial direction between adjacent rotating blades can be at least reduced thereby, is disposed between at least two adjacent rotating blades. This makes it possible to reduce leakages, by which means, for example, the efficiency of a turbo machine associated with the rotor is advantageously increased.

Additional advantages result when the sealing element is disposed radially above the damping element and/or joined with the damping element and/or is arched radially upward along its axial extent relative to an axis of rotation of the rotor.

This makes possible a particularly compact and mechanically robust arrangement of sealing and damping elements. Also, the sealing effect of the sealing element can be additionally increased by means of the damping element, by which means, for example, the adjustment and conducting of mass flows of cooling air and a particularly good sealing relative to hot gas feed or the like are made possible. Due to the radial arching of the sealing element, the advantages described above in connection with the damping element, in particular with respect to a mass distribution lying radially as far upward as possible as well as with respect to a stable and symmetrical self-alignment during operation, are realized.

In another embodiment of the invention, it is provided that a central region of the damping element is formed weaker with respect to bending and/or torsion than the ends of the damping element and/or that the damping element is designed with multiple parts and/or is mirror-symmetrical in cross section. A particularly secure contact to the rotating blades can be assured by a configuration of the central region that is weaker with respect to bending and/or torsion. In contrast, the mechanically more stable end regions of the damping element permit a better fastening to the rotating blade in question. In addition, it can be provided that the damping element is formed with multiple parts, so that for simple mounting or repair of the rotor, a first damping element part can be mounted or demounted from the high-pressure side and a second damping element part can be mounted or demounted from the low-pressure side of the rotor. The rotor and/or the rotating blades can preferably be formed in such a way that the damping element can be mounted or demounted in the final mounting state of the rotor. A particularly good damping effect as well as a secure mounting are assured by designing the damping element mirror-symmetrically in cross section.

Further advantages result by forming, underneath a blade platform of at least one rotating blade, at least one cavity, within which the damping element and/or optionally, the sealing element is (are) disposed in regions. In this way, an enlarged structural space is made available for the damping element and/or the sealing element, so that geometry and mass of the damping element and/or sealing element can be varied correspondingly in a flexible manner. In addition, the moving mass of the rotor can be advantageously reduced by means of the cavity. In another embodiment it can be provided that the rotating blade or its blade platform has two lateral or opposite-lying cavities.

In another advantageous embodiment of the invention, it is provided that the blade platform of at least one rotating blade comprises a guide element, by means of which a side and/or a bottom of the damping element can be supported. In this way, the damping element can be reliably supported and secured in position in the mounted state. The guide element advantageously can be designed curved in another embodiment. The damping element can also be mounted or demounted in a particularly simple manner when the guide element additionally functions as a guiding and contact path during the mounting of the damping element.

In another advantageous embodiment of the invention, it is provided that the guide element is disposed in the region of the high-pressure side and/or the low-pressure side of the rotor. An undesired jamming of the damping element can be prevented in this way.

In addition, it has been shown to be advantageous when an inner-lying contact surface is provided in the radially outer region of at least one blade platform, the damping element and/or optionally the sealing element being able to be brought into contact with this contact surface, at least during operation of the rotor. Since the damping element and/or the sealing element is or are moved radially upward during the rotation of the rotor, due to the centrifugal force field, it will be assured by this in a structurally particularly simple way that the damping element and/or sealing element is or are applied to the contact surface. The corresponding damping and/or sealing effect is additionally improved thereby. The damping or sealing effect can be further increased by a geometric adaptation of the contact geometry between the damping or sealing element and the contact surface.

In another advantageous embodiment of the invention, it is provided that the blade platform of at least one rotating blade forms a radially inner blade shroud for at least partially bounding a flow channel of the turbo machine. In other words, it is provided that the blade platform defines the radially inner boundary for the hot combustion gases of the turbine stage. The damping element as well as the other regions of the rotating blade and of the rotor lying radially underneath the blade platform are protected from hot gases in this way.

In another configuration, it is provided that the rotating blades are joined to the basic rotor body in a detachable manner or cohesively. A high structural freedom is achieved in this way, since the rotor can be designed as desired, either in mounted construction and/or in integral BLISK (Bladed Disk) or BLING (Bladed Ring) construction.

Another aspect of the invention relates to a turbo machine having a rotor according to one of the preceding embodiment examples. The advantages resulting therefrom can be taken from the preceding descriptions. The turbo machine is formed as an aircraft turbine in another embodiment.

Another aspect of the invention relates to a method for manufacturing, repairing, and/or overhauling a rotor for a turbo machine, in which rotating blades are joined to a basic rotor body, whereby a damping element for damping blade vibrations is disposed between at least two adjacent rotating blades. It is provided according to the invention that the damping element is arched radially upward along its axial extent relative to an axis of rotation of the rotor. In this way, an improved damping effect is assured in a structurally very simple way thereby, since the damping element moves radially upward during operation of the rotor, due to the centrifugal force field, and is applied to its associated contact surfaces of the rotating blades. In addition to this, the mass of the damping element can be shifted radially upward as far as possible by the arching. The damping element is also disposed in a position in which displacements of vibrating structures occur that are sufficient for vibration processes. By arranging the damping element between the blade platforms, due to the relative displacements between the damping element and the adjacent rotating blades or blade platforms, a great deal of energy can be dissipated even at critical resonance transitions that are due, for example, to bending and torsional vibrations, by which means, the rotor is particularly robust in a mechanical damping sense. In addition, the damping element can be integrated in the rotor in a particularly simple and cost-effective manner, and is also sparing of structural space. The structural configuration space that is available can therefore be optimally utilized in this way, so that, unlike the prior art, the configuration and size of the damping element can be selected in such a way that design and implementation requirements are completely fulfilled. In this way, the mass of the damping element serves as an optimizing parameter and for definition of switching points between so-called "locked and slipping" states of damping. The damping element can be very simply mounted and demounted, by which means corresponding cost advantages for manufacturing, repairing or overhauling of the rotor are achieved. The rotor can be designed basically in this way for use in compressor and turbine stages with and without shroud, with or without blade cooling and with or without blade cavities. In addition, it can be basically provided that one and/or several damping elements can be disposed between several and/or all of the blade platforms of the rotor, by which means a particularly flexible adaptability to different requirement profiles and configurations of the rotor is achieved. Additional advantages that result can be taken from the preceding descriptions.

In an advantageous embodiment of the invention, it is provided that the damping element is moved from the low-pressure side and/or from the high-pressure side of the rotor between the blade platforms. This makes possible a particularly simple mounting and demounting, for which reason corresponding cost advantages are achieved in the manufacturing, repairing or overhauling of the rotor. It can also be provided in this way that the damping element is formed with multiple parts and that the individual damping element parts can be mounted or demounted from different pressure sides of the rotor.

Additional advantages result by moving the damping element along inner-lying contact surfaces of the adjacent blade platforms, the contact surfaces being arched radially upward along their axial extent relative to an axis of rotation of the rotor. This makes possible a force-guided and thus a particularly simple mounting or demounting of the damping element, whereby a corresponding arched, longitudinal-section geometry of the damping element is automatically obtained in the mounted state.

In another advantageous embodiment of the invention, it is provided that a sealing element, by means of which an exchange of flow medium in the radial direction between adjacent rotating blades during operation of the turbo machine can be at least reduced thereby, is disposed between at least two adjacent rotating blades. This makes it possible to reduce leakages and to close gaps between adjacent rotating blades, whereby the efficiency of a turbo machine associated with the rotor is advantageously increased. The damping effect can be additionally increased by a geometric adaptation of the contact geometry between the damping and/or sealing element and the contact surface.

BRIEF DESCRIPTION OF THE DRAWINGS

Further features of the invention result from the claims, the examples of embodiment, as well as on the basis of the drawings. The features and combinations of features named above in the description, as well as features and combinations of features named in the following for the examples of embodiment are applicable not only in the combination indicated in each case, but are also applicable in other combinations or by themselves, without departing from the scope of the invention. Herein:

DETAILED DESCRIPTION OF THE INVENTION

Figure 1:
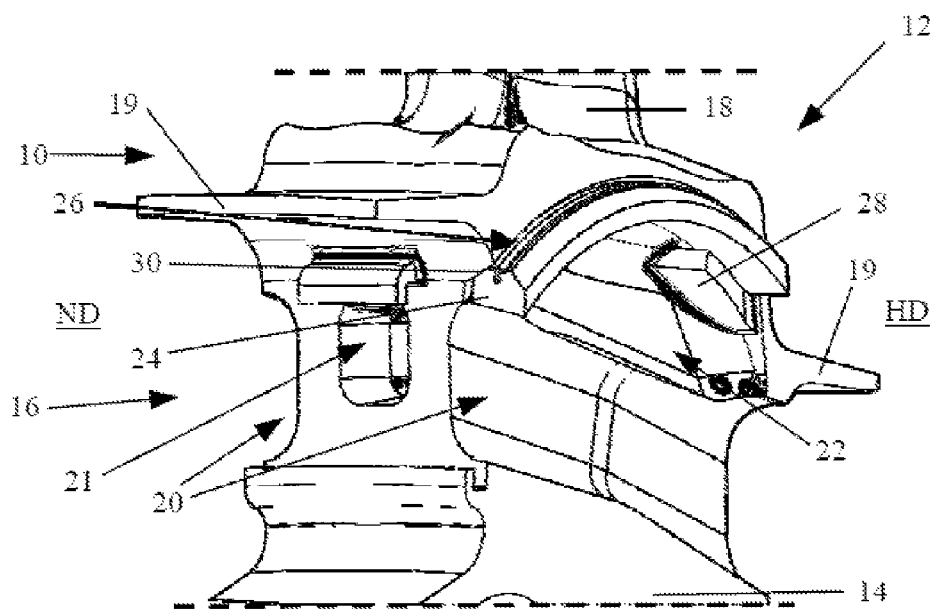
FIG. 1 shows a schematic and partially cut-away perspective view of a blade platform of a rotating blade viewed from the low-pressure side of a rotor.
Figure 2:
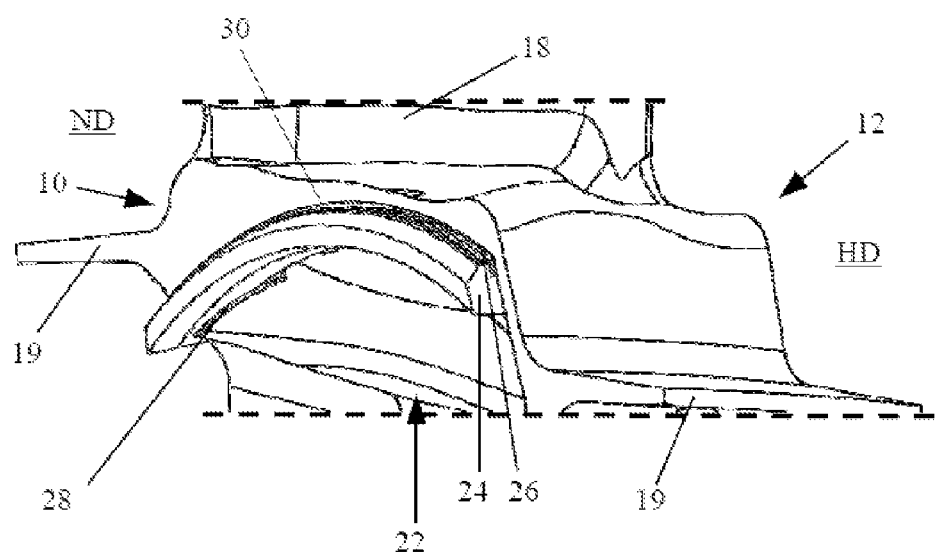
FIG. 2 shows a schematic perspective view of the blade platform shown in FIG. 1 viewed from the high-pressure side of the rotor.

FIG. 1 shows a schematic and partially cut-away perspective view of a blade platform 10 of a rotating blade 12 viewed from the low-pressure (ND) side of a rotor. FIG. 1 will be explained in the following in conjunction with FIG. 2, in which a schematic perspective view of blade platform 10 shown in FIG. 1 is illustrated, viewed from the high-pressure (HD) side of the rotor.

The rotor, which is designed presently in integral BLISK (Bladed Disk) construction for a turbine stage of an aircraft engine, comprises a basic rotor body 14, which is joined cohesively in a way known in and of itself with several rotating blades 12. A radially inner region (relative to an axis of rotation of the rotor) of a blade element 18 connecting to blade platform 10 can be recognized in FIG. 1 for the illustrated rotating blade 12. Blade platform 10, both on the low-pressure (ND) side as well as on the high-pressure (HD) side of the rotor, forms a blade shroud 19 for at least partially demarcating and limiting a flow channel of the aircraft engine.

In order to avoid high thermal stresses in basic rotor body 14, a blade neck 16 of rotating blade 12 has relief channels or slots 20 running on both sides in the axial direction between the low-pressure (ND) and the high-pressure (HD) sides of the rotor. In addition, rotating blade 12 comprises a central channel 21. Radially above relief channels 20, and radially underneath blade platform 10, each rotating blade 12 has cavities 22 on both sides in blade neck 16. A damping element 24 for damping blade vibrations is disposed in regions inside each cavity 22 in this case. Damping element 24 is formed mirror-symmetrical in cross section and has a cross-sectional surface in the form of an isosceles trapezoid in its radially upper end region. The central plane of damping element 24 in this case formally runs through gap III of the blade shroud between rotating blades 12 that are adjacent to one another (see FIG. 3).

In addition, in the present example of embodiment, a basically optional sealing element 26 is disposed radially above damping element 24 and is joined to the latter. An exchange of flow medium in the radial direction between adjacent rotating blades 12 can be reduced or completely prevented by means of sealing element 26. Sealing element 26, which is arched radially upward just like damping element 24, is formed T-shaped in cross section and is inserted into a corresponding groove of damping element 24. It should be emphasized, however, that sealing element 26 and damping element 24 may also basically have different or varying cross-sectional geometries. The precise function of damping element 24 and sealing element 26 will be explained in more detail in the following.

In addition, in the region of the low-pressure (ND) and the high-pressure (HD) sides, in each case, blade platform 10 comprises a guide element 28, by means of which a bottom side of damping element 24 is supported. The wall of blade neck 16 or of cavity 22 supports lateral regions of damping element 24. Blade platform 10 has an inner-lying contact surface 30, with which damping element 24 and sealing element 26 are brought into contact at least during operation of the rotor. Guide elements 28 and contact surface 30 are each arched or bent radially upward, whereby damping element 24 and sealing element 26 are also arched radially upward in the mounted state. In this way, due to the centrifugal forces occurring during operation of the rotor, both elements are applied reliably to contact surface 30, so that particularly high damping and sealing effects also are achieved in addition to a stable symmetrical self-alignment. In addition, arched guide elements 28 and arched contact surface 30 simplify both the mounting as well as the demounting of damping element 24 and sealing element 26.

Preferably, damping element 24 and optionally sealing element 26 for mounting from the low-pressure (ND) side are moved out into cavity 22 of blade platform 10, the guide elements 28 and the arched contact surface 30 functioning as conducting and sliding surfaces. Blade platform 10 is formed on its side facing the high-pressure (HD) side in such a way that damping element 24 and thus optionally also sealing element 26 strike it when reaching the mounting position. Alternatively, it may be provided that damping element 24 and optionally sealing element 26 are formed with multiple parts and the element parts in question will be mounted or demounted both from the high-pressure (HD) side as well as from the low-pressure (ND) side.

Figure 3:
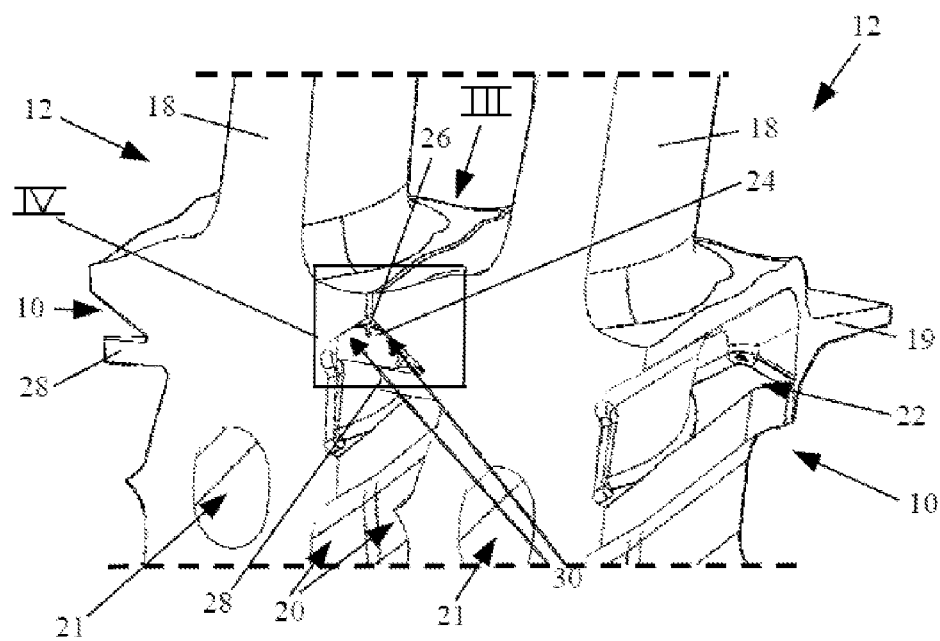
FIG. 3 shows a perspective sectional view of two adjacent rotating blades.

FIG. 3 shows a perspective sectional view of two adjacent rotating blades 12, between which are disposed damping element 24 and sealing element 26 in the region of the respective blade platforms 10. Here it can be particularly recognized that sealing element 26 is pressed against the inner-lying support surface 30 at least during operation of the rotor and reduces or completely prevents a radial throughput of flow medium through gaps III in the blade shroud between adjacent rotating blades 12. Correspondingly, the damping element 24 is also pressed against the contact surfaces 30, by which means a particularly good damping effect is achieved. In addition, the sealing effect of sealing element 26 is also further improved in this way.

Figure 4:
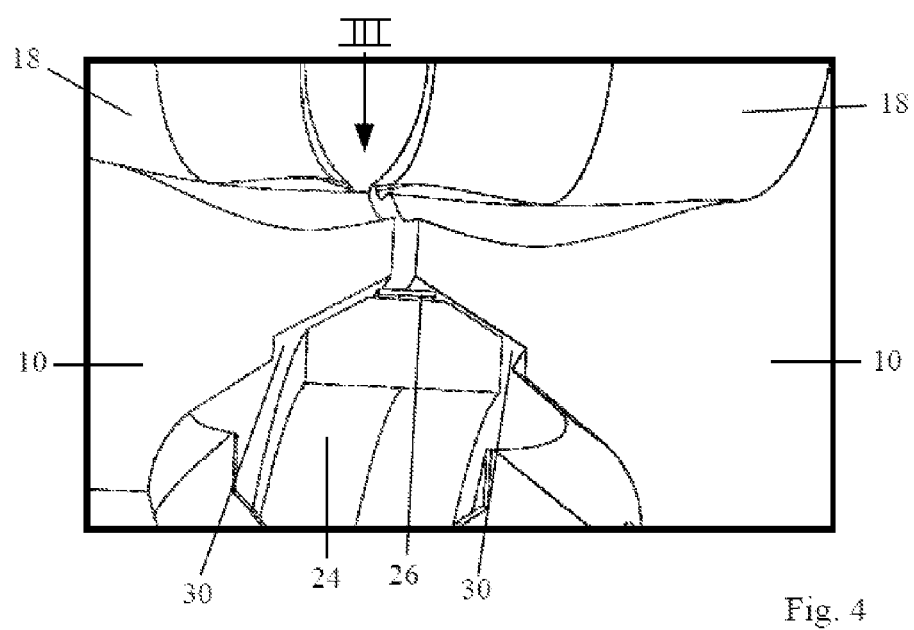
FIG. 4 shows an enlarged perspective view of the detail IV shown in FIG. 3.

FIG. 4 shows an enlarged perspective view of the detail IV shown in FIG. 3 for further clarification. Here, it can be well recognized that the contact geometry of contact surfaces 30 and of damping element 24 can be optimally adapted to one another, by which means a particularly high damping effect is achieved during operation. Further, the geometry of sealing element 26 is also adapted to the contact geometry of adjacent contact surfaces 30, so that sealing element 26 also is applied flat on the adjacent contact surfaces 30, at least during operation, due to the centrifugal forces that occur, and seals gaps III in the blade shroud. In this way, it can also be basically provided that a central region of damping element 24 is formed weaker than the ends of damping element 24 with respect to bending and torsion, in order to make possible a particularly secure contact. Alternatively or additionally, it can be basically provided that the contact between damping element 24 and contact surfaces 30 is produced over the entire length of damping element 24 or only over specific length regions of damping element 24.

What is claimed is:

1. A rotor for a turbo machine having rotating blades (12), which are joined to a basic rotor body (14), in which a damping element (24) for damping blade vibrations is disposed at least partially in a gap defined between blade platforms (10) of at least two adjacent rotating blades (12), wherein the damping element (24) is arched radially upward along its axial extent relative to an axis of rotation of the rotor and wherein a sealing element (26), by means of which an exchange of flow medium in the radial direction between adjacent rotating blades (12) can be at least reduced thereby, is disposed between at least two adjacent rotating blades (12) with the sealing element (26) being disposed radially above damping element (24).

2. The rotor according to claim 1, wherein the sealing element (26) is disposed radially above damping element (24), sealing element (26) is joined with damping element (24) and/or is arched radially upward along its axial extent relative to an axis of rotation of the rotor.

3. The rotor according to claim 1, wherein the damping element (24) includes a central region; the central region of the damping element (24) is formed weaker with respect to bending and torsion than the ends of damping element (24) and/or that the damping element is formed with multiple parts and/or is designed mirror-symmetrical in cross section.

4. The rotor according to claim 1, wherein at least one cavity (22) is formed underneath a blade platform (10) of at least one rotating blade (12), the damping element (24) and/or optionally the sealing element (26) being disposed in regions within this cavity.

5. The rotor according to claim 1, wherein the blade platform (10) of at least one rotating blade (12) comprises a guide element (28), by means of which a side and/or a bottom of damping element (24) can be supported.

6. The rotor according to claim 5, further characterized in that guide element (28) is disposed in the region of the high-pressure (HD) side and/or the low-pressure (ND) side of the rotor.

7. The rotor according to claim 1, wherein an inner-lying contact surface (30) is provided in the radially outer region of at least one blade platform (10), and damping element (24) and/or optionally a sealing element (26) can be brought into contact with this contact surface, at least during the operation of the rotor.

8. The rotor according to claim 1, wherein the blade platform (10) of at least one rotating blade (12) forms a blade shroud (19) for at least a partial boundary of a flow channel of the turbo machine.

9. The rotor according to claim 1, wherein the rotating blades (12) are joined to the basic rotor body (14) in a detachable manner or cohesively.

10. The rotor according to claim 1, wherein the rotor is configured for use in a turbo machine.

11. The rotor according to claim 1, wherein the damping element (24) includes a central region; the central region of the damping element (24) is formed weaker with respect to bending and torsion than the ends of damping element (24).

12. The rotor according to claim 1, wherein the damping element (24) has a cross-sectional surface in the form of an isosceles trapezoid in its radially upper end region, the isosceles trapezoid having a first side extending along a first upper surface, the isosceles trapezoid having a second side extending along a second upper surface, the first and second upper surfaces being configured to contact respective contact surfaces on the adjacent blades.

13. The rotor according to claim 1, wherein the damping element is shaped in an arch that has a peak between a first end and a second end, the peak being further radially upward than the first end and the second end.

14. A method for manufacturing, repairing, and/or overhauling a rotor for a turbo machine, comprising the steps of:
joining rotating blades (12) to a basic rotor body (14);
disposing a damping element (24) for damping blade vibrations between at least two adjacent rotating blades (12); wherein the damping element (24) is arched radially upward along its axial extent relative to an axis of rotation of the rotor and
moving the damping element (24) from a low-pressure (ND) side and/or a high-pressure (HD) side of a rotor at least partially in a gap defined between blade platforms (10).

15. The method according to claim 14, further comprising the step of:
moving the damping element (24) along inner-lying contact surfaces (30) of adjacent blade platforms (10), the contact surfaces (30) being arched radially upward along their axial extent relative to an axis of rotation of the rotor.

16. The method according to claim 14, further comprising the step of:
   disposing a sealing element (26), by means of which an exchange of flow medium in the radial direction between adjacent rotating blades during the operation of the turbo machine can be at least reduced thereby, between at least two adjacent rotating blades (12).

17. The method according to claim 14, wherein the damping element (24) has a cross-sectional surface in the form of an isosceles trapezoid in its radially upper end region, the isosceles trapezoid having a first side extending along a first upper surface, the isosceles trapezoid having a second side extending along a second upper surface, the first and second upper surfaces being configured to contact respective contact surfaces on the adjacent blades.

* * * * *